United States Patent [19]

Hogge, Jr.

[11] 4,218,771

[45] Aug. 19, 1980

[54] AUTOMATIC CLOCK POSITIONING CIRCUIT FOR A DIGITAL DATA TRANSMISSION SYSTEM

[75] Inventor: Charles R. Hogge, Jr., Richardson, Tex.

[73] Assignee: Rockwell International Corporation, El Segundo, Calif.

[21] Appl. No.: 965,960

[22] Filed: Dec. 4, 1978

[51] Int. Cl.² .............................................. H03D 3/24
[52] U.S. Cl. ...................................... 375/120; 371/61
[58] Field of Search ............... 178/69.1; 340/146.1 D; 328/72, 1 SS

[56] References Cited

U.S. PATENT DOCUMENTS

| | | | |
|---|---|---|---|
| 3,407,356 | 10/1968 | Meranda | 328/72 |
| 3,557,308 | 1/1971 | Alexander et al. | 328/72 |
| 3,633,115 | 1/1972 | Epstein | 328/72 |
| 3,721,959 | 3/1973 | George | 340/146.1 A X |
| 3,961,311 | 1/1976 | Pavoni et al. | 340/146.1 D |
| 3,989,894 | 2/1976 | Charransol et al. | 340/146.1 D |

OTHER PUBLICATIONS

*IEEE Transactions on Communication Technology,* vol. COM-16, pp. 380–387, Jun. 1968—"Performance Monitor Techniques for Digital Receivers Based on Extrapolation of Error Rate" by D. J. Godding.

*IEEE Transactions on Communication Technology,* vol. COM-19, pp. 1149–1155, Dec. 1971—"Estimation of Small Probabilities by Linearization of the Tail of a Probability Distribution Function" by S. B. Weinstein.

*IEEE Transactions on Communications,* vol. COM-23, pp. 518–525, May, 1975, "A Bit Error Rate Monitor for Digital PSK Links" by B. J. Leon, H. L. Hammond, Jr., P. A. Vena, W. E. Sears, III and R. T. Kitahara.

*Primary Examiner*—Benedict V. Safourek
*Attorney, Agent, or Firm*—H. Fredrick Hamann; Howard R. Greenberg; Richard K. Robinson

[57] ABSTRACT

The phase of the clock timing pulses are continuously optimized relative to the received signal under the control of pseudo-error detectors.

7 Claims, 4 Drawing Figures

AUTOMATIC CLOCK POSITIONING CIRCUIT FOR A DIGITAL DATA TRANSMISSION SYSTEM

BACKGROUND OF THE INVENTION

This invention relates generally to a clock positioning circuit for automatically positioning the timing pulses used for a digital data transmission system.

In electronic data transmission, the quality or reliability of the transmission system may be expressed in terms of a bit error rate, i.e., the number of erroneously received digital pulses per unit of time divided by the bit rate of the data channel. The error rate is determined by a number of factors including intersystem interference, noise, fading, equipment misadjustment and the like.

One method of improving the quality of a data transmission channel has been through the use of automatic gain control (AGC) in the receivers. Provisions are made to switch channels when the gain control feedback exceeds certain limits. While this method can detect a weak or faded signal, signal distortion due to noise is not identified and may go undetected. Another method employs the transmission of a known pattern of data as a means for checking the received data for accuracy. Of course, normal transmissions must be interrupted for transmission of the known patterns.

It is often necessary—particularly in the case of "hot standby" and diversity systems—to have a continuous rapid responding and reasonably accurate estimate of whether the bit error rate (BER) of a digital system such as a digital radio exceeds some predetermined value. This estimate should include the effects of degradation in alignment of the modulator, RF and IF circuits, the carrier recovery, phase detector and clock recovery portion of the demodulator, and the effects of distortion. Such an estimate can be obtained in the moddemod section by using a pseudo-error detector. The pseudo-error detector provides a measure of the quality of the "eye pattern" and from this measurement a close approximation of the actual bit error rate can be extrapolated. As used herein the "eye pattern" or "eye opening" refers to the image as seen on an oscilloscope in response to digital data when the horizontal sweep rate is equal to the baud, bit or clock rate. Such an oscilloscope display is widely known in the art as an "eye pattern" due to its resemblance to the human eye. Reference may be made to U.S. Pat. No. 3,721,959. Also, in this context, the term "mod-demod section" is used to describe a section where the eye pattern and the BER are directly related. (A single pseudo-error detector can only monitor what takes place between data regenerators.)

For further discussion relating to error detection, reference may be made to: D. J. Godding, "Performance Monitor Techniques for Digital Receivers Based on Extrapolation of Error Rate", *IEEE Transactions on Communication Technology*, Vol. COM-16, pp. 380–387, June 1968; S. B. Weinstein, "Estimation of Small Probabilities by Linearization of the Tail of a Probability Distribution Function," *IEEE Transactions on Communication Technology*, Vol. COM-19, pp. 1149–1155, December 1971; and, B. J. Leon, H. L. Hammond, Jr., P. A. Vena, W. E. Sears, III and R. T. Kitahara, "A Bit Error Rate Monitor for Digital PSK Links," *IEEE Transactions on Communications*, Vol. COM-23, pp. 518–525, May, 1975, which detail analytical studies of the subject, especially when related to FSK, BPSK and WPSK signals, and broadly to all forms of digital transmission.

In the above referenced U.S. Pat. No. 3,721,959 an approach to pseudo-error monitoring was disclosed which uses a dual voltage comparator to compare an eye pattern with an established reference voltage and clock pulse having a selected pulse width that is used to define a rectangular boundary within the eye pattern such that each violation of the boundary is detected and counted as a pseudo-error. When the signal to noise ratio is high and the signal is not degraded by transmission distortion, the eye pattern will not violate the window. Conversely, any combination of noise and distortion of sufficient magnitude can cause the baseband signal to become distorted so that the window is violated and the baseband signal voltage at the input to the comparator falls between two established thresholds, which results in the outputs of the two comparators to simultaneously change states. A Boolean AND function is performed upon the two outputs of the voltage comparator to give a logic one pulse for each window violation which is counted as a pseudo-error.

The pseudo-error detector is very useful for an effective channel indicator on a multi-channel system, where an indication that a preselected number of errors have been received on a message channel for a given period of time will enable the determination that the message channel is defective. It is thus a relatively easy matter to switch to an alternate channel with a less predominant bit error rate.

Although the above references provide techniques for detecting error rates and pseudo-error rates, they fail to provide a means for minimizing the bit error rate without switching modes of operation or communication channels. It has been found that a minimum bit error rate (BER) can be achieved by centering within the eye pattern the timing pulses that are used to synchronize the received data with the data detection circuits.

SUMMARY OF THE INVENTION

The phase of the clock timing pulses are continuously optimized relative to the received signal under the control of pseudo-error detectors.

The invention provides the method and apparatus for taking a string of timing pulses that are either locally generating or obtained by other techniques such as demodulation of the pulses from a modulated data stream and insuring that the pulses are properly positioned within the center of each data bit by developing an "eye pattern" analog signal and establishing a late clock boundary condition and an early clock boundary condition that are symmetrical about the center of the "eye opening." When the timing pulses occur, either coincidental or earlier than the early clock pulse condition, a pseudo-error signal is generated which is integrated and used to adjust the phase of the timing pulses.

This and many other objects and purposes of the invention will be clear from the following detailed description of the invention.

DETAILED DESCRIPTION OF THE INVENTION

Figure 1:
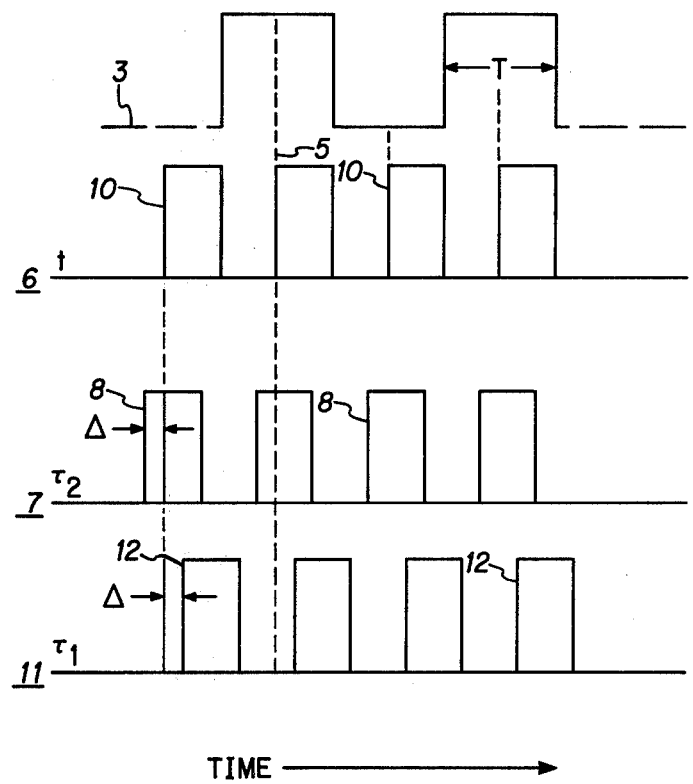
FIG. 1 is a timing diagram of a digital data stream.

Referring now to the drawings, FIG. 1 illustrates a digital data stream 3 which has a pulse width of T. Corresponding to the digital data stream 3, there is a stream of timing pulses t shown by waveform 6 which are used in the detection process, error detection process, data storage and data handling. These timing pulses, for the purposes of this invention, occur in the center of each data bit as indicated at 5. Although in FIG. 1, the clock pulses do occur in the center of each data bit and the teachings of this invention pertain to insuring that the clock pulses do occur in the center of each data bit, it is well known to those skilled in the art that once a definite relationship has been established between the received data bits and their associated clock pulses, then it is a relatively simple operation to position the clock pulses anywhere within the data bit period that is desirable.

There is an early occuring clock signal $\tau_2$ shown by waveform 7 whose leading edge 8 precedes the leading edge 10 of waveform 6 by a tolerance of $\Delta$ time. There is also a late occurring clock signal $\tau_1$ represented by waveform 11 whose leading edge 12 follows the leading edge 10 of waveform 6 by a tolerance of $\Delta$ time. The tolerance of $\Delta$ is centered around the leading edge 10 of the timing pulse $\tau$ as well as the center 5 of the data bits.

Figure 2:
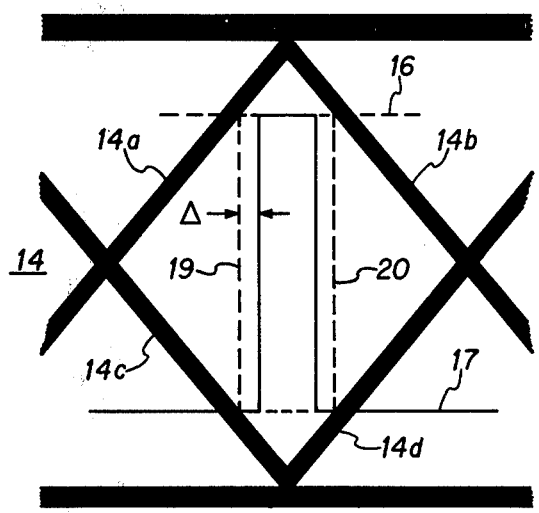
FIG. 2 is an eye pattern with boundary condition defined therein.

FIG. 2 is the corresponding "eye pattern" of FIG. 1 and because in most digital radio receivers the received data signal is heavily filtered, the eye pattern as a consequence of the filtering, is distorted and as such is represented more or less by a diamond shaped eye pattern.

There is established an upper boundary condition 16 and a lower boundary condition 17 in the eye pattern. The timing pulses $\tau_2$ as shown by waveform 7 in FIG. 1 establish the early boundary condition 19 while the delayed boundary condition 20 is established by the delayed timing pulses $\tau_1$ of waveform 11 of FIG. 1. Under ideal conditions, the clock or timing pulses associated with each data bit will occur in the center of the eye pattern. However, when a side 14a, 14b, 14c or 14d of the eye pattern crosses the boundary conditions established by the upper boundary 16, the lower boundary 17, the early clock pulse $\tau_2$ at 19 or the late clock pulse $\tau_1$ at 20, then a pseudo-error occurs.

Figure 3:
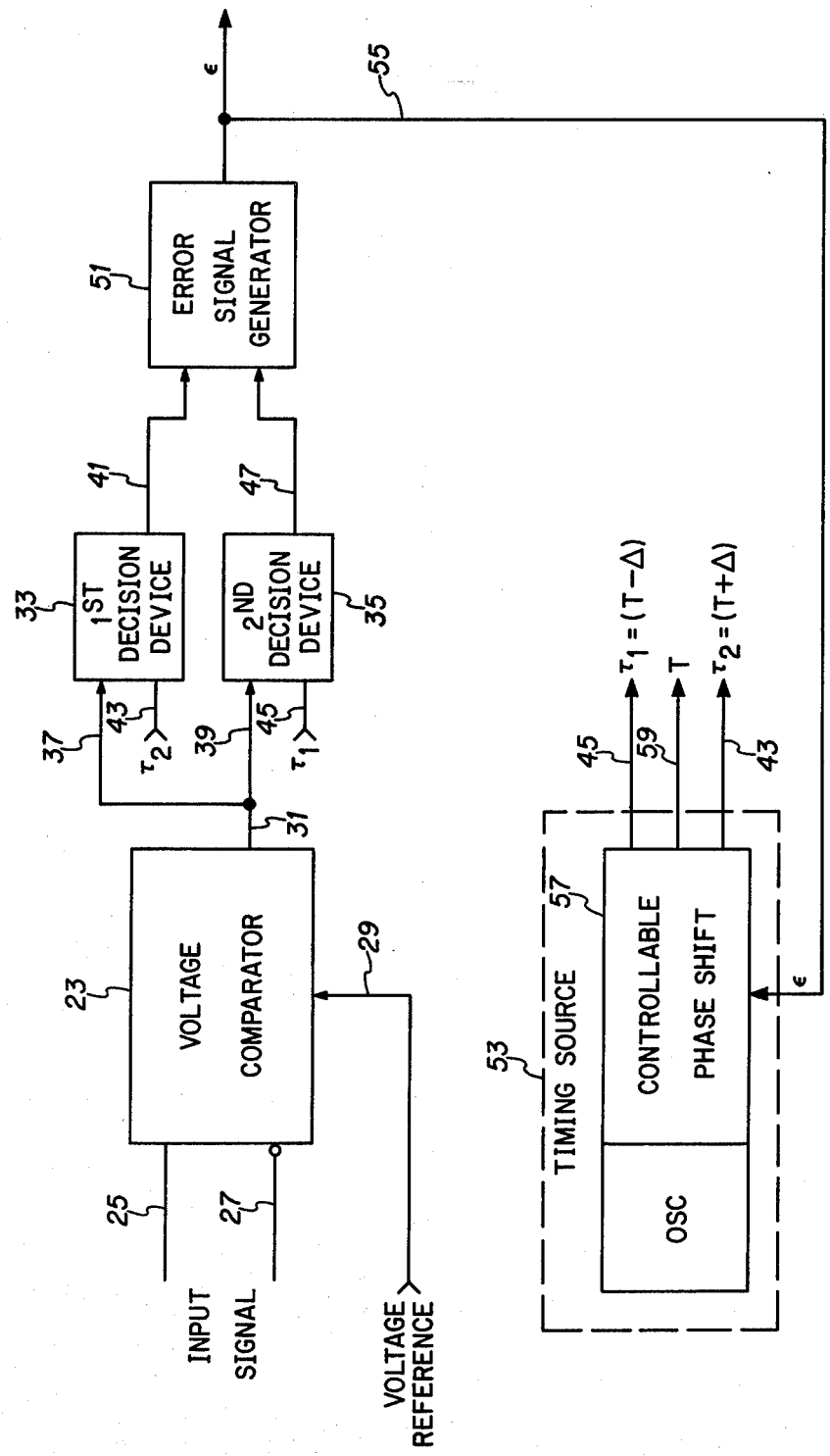
FIG. 3 is a block diagram of the automatic clock positioning circuit according to the teachings of this invention.

FIG. 3 is a block diagram of the clock positioning circuit and provides for essentially monitoring the eye pattern of FIG. 2 for pseudo-errors by applying the received data signal to voltage comparator 23 at terminals 25 and 27. A reference signal is applied to conductor 29 and is used to establish the upper boundary condition 16 and the lower boundary condition 17 (shown in FIG. 2) in the voltage comparator. The output of the voltage comparator appears on terminal 31 and is coupled to a first decision device 33 and also to a second decision device 35 by means of conductors 37 and 39, respectively. The first decision device is used to indicate a pseudo-error when the output of the voltage comparator 23 indicates that there has been a transgression of the boundary conditions at the occurrence of a pulse $\tau_2$ which is connected from the timing source 53 to the first decision device by means of conductor 43. Similarly, $\tau_1$ is connected to the second decision device by means of conductor 45 and if there has been a transgression of the boundary conditions, then the output of the voltage comparator will have an error condition present on conductor 30 at the occurrence of a pulse $\tau_1$. The output of the first decision device and second decision device appears on conductors 41 and 47 respectively and indicates a pseudo-error when there is a logic 1 present on these conductors. The pseudo-errors from the first and second decision devices are each integrated and compared to each other by the error signal generator 51, the output of which provides error signal on conductor 55 which is coupled to the timing source 53 that has a controllable phase shift section 57 for adjusting the phase shift of the timing pulses T that appear on conductor 59.

Figure 4:
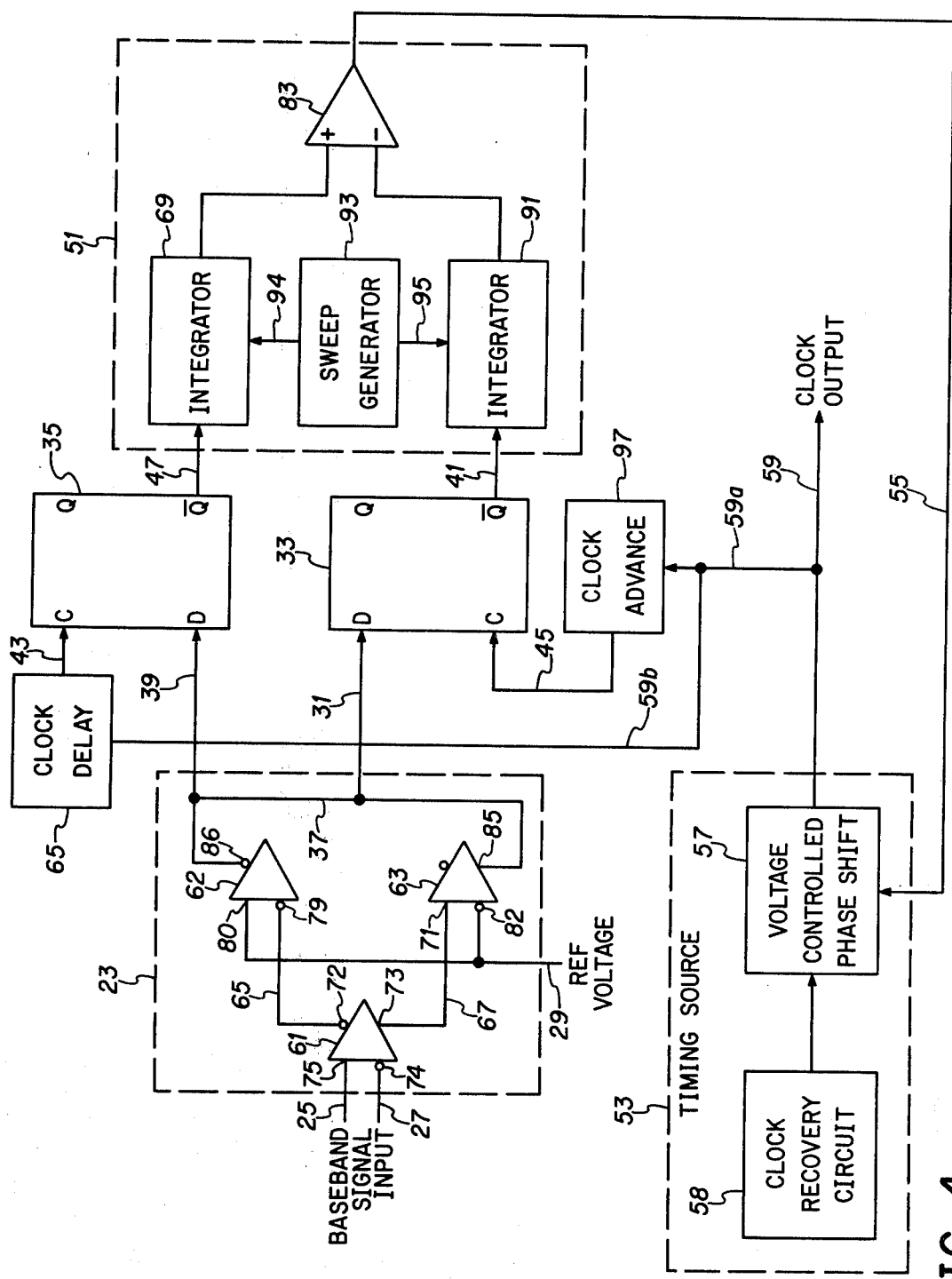
FIG. 4 is a more detailed block diagram of the clock positioning circuit of FIG. 3.

FIG. 4 is a more detailed block diagram of the circuitry of FIG. 3 and provides a voltage comparator 23 which consists of differential amplifiers 61, 62 and 63. The clock positioning circuit of FIG. 4 is designed to be used in a digital radio which receives a heavily filtered 8 phase shift keyed signal that is capable of carrying 90.258 Mb/s in a 40 MHz bandwidth at 11 GHz. Because of the high speeds, emitter couple logic (ECL) circuit devices were used to implement the voltage comparator 23 and consist of devices that are commercially available. One appropriate device is an ECL10216 available from Motorola Semiconductor Products, Inc. which is a triple line receiver configured on a single chip. The line receivers serve as differential amplifiers having differential inputs and differential outputs as represented in FIG. 4. The baseband signal is applied, as in the case of FIG. 3, to conductors 27 and 25 which are connected to noninverting input terminal 75 and inverting input terminal 74. The inverted output of the difference of the signal on terminals 75 and 74 appears on terminal 72, while the noninverting output appears on terminal 73 of amplifier 61. Conductor 65 connects the inverted output of amplifier 61 to the negative input terminal 79 of amplifier 62 while conductor 67 connects the noninverted output terminal 73 of amplifier 61 to positive terminal 71 of amplifier 63. A voltage reference source (not shown) is connected to conductor 29 for establishing the upper and lower boundary conditions 16 and 17 of FIG. 2. Conductor 29 is connected to terminal 80 of amplifier 62 to establish upper boundary condition 16 while the lower boundary condition 17 is established by connecting the voltage source by means of conductor 29 to the negative terminal 82 of amplifier 63. The outputs as appear on terminal 86 of amplifier 62 and terminal 85 of amplifier 63 are wired "OR'D" together to provide the comparator output on conductors 31, 37 and 39 which are connected to the first and second decision devices. The first decision device and the second decision device are, in the application of this circuitry, "D" type flip-flops 33 and 35.

The timing source 53 includes a means for providing a stream of timing pulses such as a clock recovery circuit 58 and a controllable phase shift device 57 and provides on conductor 59 a timing stream which, as mentioned earlier, is used to synchronize the received data with the operation of the receiver. Conductor 59a connects the timing stream to the clock advance circuitry 97 which advances the timing stream to generate the $\tau_2$ clock pulses which appear on conductor 45 for clocking "D" type flip-flop 33 and conductor 59b connects the system timing stream to the clock delay circuitry 65 which delays the clock pulses by $\Delta$ to provide timing stream $\tau_1$ that appears on conductor 43 and is used to clock the "D" type flip-flop 35.

It should be noted that the outputs that appear on conductors 41 and 47 are pseudo-error indicators and could be wired "OR'D" together and used when combined with clock pulses as a means of counting pseudo-errors. However, for the purposes of describing FIG. 4, the outputs 41 and 47 are applied to the error signal generator 51. The error signal generator 51 consists of two integrating circuitries 69 and 91, which integrate the pseudo-errors that appear at their inputs over a long period of time and provide error signals on their outputs which are connected in difference amplifier 83. The difference in the integrators is an error signal that is used to vary the phase of the timing signals T by adjusting the controllable phase shift device 57.

For initial startup or data reception conditions, there is also provided a sweep generator 93 which is connected to the integrators 69 and 91 by means of conductors 94 and 95 and will cause the clock position circuitry to vary the phase of the timing signals until the optimum phase is obtained.

The controllable phase shift device can be any of the known types of phase shift devices known to those skilled in the art such as a varactor diode tuned circuit.

Numerous modifications of the foregoing disclosure are possible without departing from the scope and spirit of the invention engendered thereby. Thus, the invention is not to be limited to the scope of the foregoing disclosure, but rather by the appended claims.

I claim:

1. An automatic clock positioning circuit for automatically positioning a clock pulse for a digital data stream that resembles an eye pattern when seen on an oscilloscope in response to digital data when the sweep is equal to the baud, bit or clock rate, comprising:
   timing source for providing a stream of clock pulses;
   controllable phase shift means electrically connected to said timing source and in response to an error signal will either advance, delay or maintain the phase of said stream of clock pulses;
   pseudo-error indicator means for providing an upper, lower, early and late boundary condition within the center of the eye pattern of the digital data stream and providing a first pseudo-error signal for each violation of the upper or lower boundary condition by the eye pattern at the early boundary condition and a second pseudo-error signal for each violation of the upper and lower boundary condition at the late boundary of the eye pattern:
   means for integrating the first and second error signals;
   means for comparing the integrated first error signal with the integrated second pseudo-error signal providing an error correcting signal; and
   means for controlling the controllable phase shift means with the error connecting signal.

2. The automatic clock positioning circuit according to claim 1 wherein the pseudo-error indicators further comprises:
   boundary reference signal;
   voltage comparator connected to the boundary reference signal for receiving an analog signal of the transmitted data and for comparing the analog signal with the boundary reference signal;
   first decision device;
   clock advance device;
   means for providing the stream of clock pulses to the clock advance device whereby the clock pulses are advanced in time by a predetermined period;
   means for connecting the advance clock pulses to the first decision device;
   means for connecting the output of the voltage comparator device to the first decision device whereby upon the occurrence of the advance clock pulse the first decision device will generate a first pseudo-error indication if the analog signal is less than the boundary signal;
   second decision device;
   means for connecting the output signal from the voltage comparator to an input terminal of the second decision device;
   clock delay device;
   means for connecting the timing source to the clock delay device; and
   means for connecting an output of the clock delay device to a clock input of the second decision device, the second decision device being responsive to the delay clock pulse producing a second pseudo-error indication if the analog signal is less than the boundary signal.

3. The automatic clock positioning circuit according to claim 1, further comprising:
   first integrator means for receipt of the first pseudo-error signal and for producing a first integrated output;
   second integrator means for receipt the second pseudo-error signal and producing a second integrated output; and
   difference amplifier means electrically connected to the output of the first integrated means and the second integrator means whereby the difference amplifier means generates the error correction signal by obtaining the difference between the first integrated output and the second integrated output.

4. The automatic clock phase positioning circuit of claim 3 further comprising a sweep generator circuit electrically connected to the first and second integrator means.

5. The automatic clock positioning circuit according to claim 2 wherein said voltage comparator means comprises:
   first differential amplifier for receipt of the analog signal across the differential input terminals;
   second amplifier means having a noninverting input terminal connected to the reference boundary signal and an inverting input terminal connected to an inverted output terminal of the first amplifier means;
   third amplifier means having an inverted input terminal connected to the reference boundary signal and a noninverted input terminal connected to the noninverted output terminal of the first amplifier means; and
   node point connected to an inverted output terminal of the second amplifier means and to a noninverted output terminal of the third amplifier means.

6. A method of automatically positioning a clock pulse in a digital data stream that resembles an eye pattern when seen on an oscilloscope in response to digital data when the sweep is equal to the baud, bit or clock rate, comprising:
   providing an upper, lower, early and late boundary condition within the center of the eye pattern of the digital data stream;
   providing a first pseudo-error signal for each violation of the upper or lower boundary conditions by the eye pattern at the early boundary condition;

providing a second pseudo-error signal for each violation of the upper or lower boundary condition by the eye pattern at the late boundary condition;
integrating the first and second pseudo-error signals;
comparing the integrated first and second pseudo-error signals; and
adjusting the position of the clock pulse with the signal that results from the comparison of the integrated first and second pseudo-error signals.

7. A method of automatically positioning a clock pulse according to claim 6 further comprising:
comparing the digital data stream to a boundary established by a reference signal;
establishing a clock window around the clock pulse that encompasses an area on each side of the clock pulse and including the steps of generating a first clock pulse that occurs $\Delta$ time prior to the clock pulse and a second clock pulse that occurs $\Delta$ time after the clock pulse;
taking a first sampling of the output after comparison of the digital signal to the boundary conditions to determine if the input signal is less than the boundary condition at the occurrence of the first clock pulse;
taking a second sampling of the result of the comparison between the digital data stream and the boundary at the occurrence of the second clock pulse to determine if the digital data stream is less than the boundary; and
generating an error signal from the results of the first sampling and the second sampling.

* * * * *